United States Patent
Park et al.

(10) Patent No.: US 10,319,115 B2
(45) Date of Patent: Jun. 11, 2019

(54) IMAGE COMPRESSION DEVICE

(71) Applicant: ELECTRONICS AND TELECOMMUNICATIONS RESEARCH INSTITUTE, Daejeon (KR)

(72) Inventors: Seong Mo Park, Daejeon (KR); Sung Eun Kim, Daejeon (KR); Ju-Yeob Kim, Daejeon (KR); Jin Kyu Kim, Sejong (KR); Kwang Il Oh, Daejeon (KR); Joo Hyun Lee, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/698,499

(22) Filed: Sep. 7, 2017

(65) Prior Publication Data
US 2018/0268571 A1    Sep. 20, 2018

(30) Foreign Application Priority Data
Mar. 14, 2017 (KR) .................. 10-2017-0031973

(51) Int. Cl.
  *G06T 9/00*    (2006.01)
  *G06T 7/11*    (2017.01)
  *G06T 7/194*    (2017.01)

(52) U.S. Cl.
  CPC .............. *G06T 9/002* (2013.01); *G06T 7/11* (2017.01); *G06T 7/194* (2017.01); *G06T 2200/28* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 9,549,204 | B2 | 1/2017 | Lee et al. |
| 2012/0114240 | A1* | 5/2012 | Yamada ............... G06T 7/11 382/173 |
| 2014/0328390 | A1 | 11/2014 | Jang et al. |
| 2015/0117520 | A1 | 4/2015 | Zhou |

(Continued)

FOREIGN PATENT DOCUMENTS

KR    10-2014-0131606 A    11/2014

OTHER PUBLICATIONS

Ross Girshick et al., "Region-based Convolutional Networks for Accurate Object Detection and Segmentation", IEEE Transactions on Pattern Analysis and Machine Intelligence, Jan. 1, 2016, pp. 1-16, vol. 38, Issue 1.

(Continued)

*Primary Examiner* — Delomia L Gilliard

(57) ABSTRACT

Provided is an image compression device including an object extracting unit configured to perform convolution neural network (CNN) training and identify an object from an image received externally, a parameter adjusting unit configured to adjust a quantization parameter of a region in which the identified object is included in the image on the basis of the identified object, and an image compression unit configured to compress the image on the basis of the adjusted quantization parameter.

9 Claims, 7 Drawing Sheets

(56) References Cited

U.S. PATENT DOCUMENTS

| | | | |
|---|---|---|---|
| 2016/0104058 A1* | 4/2016 | He | G06F 17/30247 |
| | | | 382/156 |
| 2016/0275354 A1 | 9/2016 | Andaló et al. | |
| 2016/0353107 A1* | 12/2016 | Lou | H04N 19/182 |
| 2017/0220879 A1* | 8/2017 | Nakamura | G06T 7/00 |
| 2018/0075290 A1* | 3/2018 | Chen | G06K 9/00281 |

OTHER PUBLICATIONS

Jarno Vanne et al., "Efficient Mode Decision Schemes for HEVC Inter Prediction", IEEE Transactions on Circuits and Systems for Video Technology, Sep. 2014, pp. 1579-1593, vol. 24, No. 9, IEEE.

* cited by examiner

IMAGE COMPRESSION DEVICE

CROSS-REFERENCE TO RELATED APPLICATIONS

This U.S. non-provisional patent application claims priority under 35 U.S.C. § 119 of Korean Patent Application No. 10-2017-0031973, filed on Mar. 14, 2017, the entire contents of which are hereby incorporated by reference.

TECHNICAL FIELD

The present disclosure relates to image compression, and more particularly, to an image compression device.

BACKGROUND

Due to increase in demand for image service-related content, image compression technology is widely used in various industrial fields such as a smart phone, a video conference, a surveillance camera, image archiving, a black box, or a high resolution TV. As one example, H. 264 standard, which is one of image compression standards, is commonly developed by the Video Coding Experts Group (VCEG) of the International Telecommunication Union (ITU) and the Moving Picture Experts Group (MPEG) of the International Organization for Standardization (ISO), which are an international moving picture standardization group, and is currently widely used in the field of image compression technology.

Nowadays, the High-Efficiency Video Coding (HEVC) standard having a higher compression rate than the H.264 standard has been developed, and the HEVC standard is general-purpose moving picture encoding technology that may be used in various image compression systems and various environments. The HEVC is advantageous for high speed processing through high speed algorithm, but has high hardware complexity.

SUMMARY

The present disclosure provides an image compression device for separating an object, a character, and a background from each other in an image using a convolutional neural network (CNN) algorithm and on the basis of this, adjusting a quantization parameter to provide an enhanced compression rate and image quality.

An embodiment of the inventive concept provides an image compression device including: an object extracting unit configured to perform convolution neural network (CNN) training and identify an object from an image received externally; a parameter adjusting unit configured to adjust a quantization parameter of a region in which the identified object is included in the image on the basis of the identified object; and an image compression unit configured to compress the image on the basis of the adjusted quantization parameter.

In an embodiment, the object extracting unit may set modified-regions in the received image and perform the CNN training on a portion of the set modified-regions to identify a type of an object included in the portion of the set modified-regions.

In an embodiment, the object extracting unit may classify each of the modified-regions into one of a background region and an object region on a basis of pixel change amounts of the respective set modified-regions.

In an embodiment, the object extracting unit may classify the modified-region into the background region, when the pixel change amount is smaller than a reference value in each of the set modified-regions, and classify the modified-region into the object region when the pixel change amount is equal to or greater than the reference value.

In an embodiment, the object extracting unit may convert the modified-region that is classified into the object region into a warped-region and perform the CNN training using the warped-region as an input to identify a type of the object included in the object region.

In an embodiment, the parameter adjusting unit may set a quantization parameter for the background region to a first value and set a quantization parameter for the object region to a second value smaller than the first value.

In an embodiment, the parameter adjusting unit may set a quantization parameter for the background area to a first value, set a quantization parameter for the object region to a second value smaller than the first value when the type of the object included in the object region is a text, and set the quantization parameter for the object region to a third value smaller than the second value when the type of the object included in the object region is not the text.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
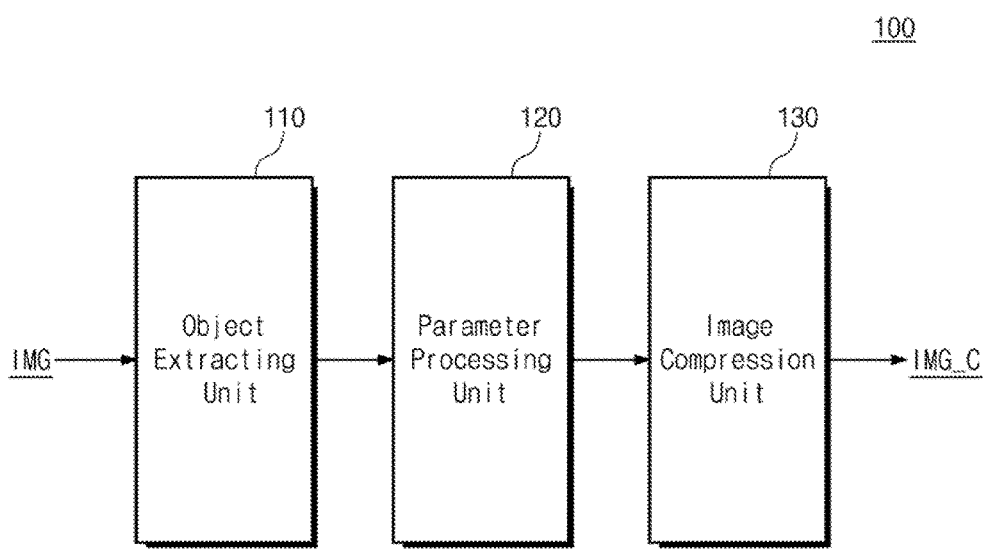
FIG. 1 is a block diagram showing an image compression device according to an embodiment of the inventive concept.

Hereinafter embodiments of the inventive concept will be described in detail with reference to the accompanying drawings. In the following description, specific details such as detailed components and structures are provided to assist overall understanding of embodiments of the present disclosure. Therefore, various changes or modifications can be made by those of ordinary skill in the art in the specific details without departing from technical spirit and scope of the present disclosure.

Furthermore, descriptions of well-known functions and structures will be omitted for clarity and conciseness. Terms used herein are defined in consideration of functions of the present disclosure, and are not limited specific functions. The definitions of the terms can be determined based on details described in the specification.

Modules in the following drawings or description can be connected things other than elements shown in the drawings or described in the specification. Modules or elements can be respectively connected directly or indirectly to each other. Modules or elements can be respectively connected by communication or physical connection.

Elements described with reference to terms such as part, unit, module, or layer used in the description and functional blocks illustrated in the drawings can be implemented in a form of software, hardware, or a combination thereof. For example, the software can be machine code, firmware, embedded code, and application software. Also, for example, the hardware can be electrical circuitry, electronic circuitry, processor, computer, integrated circuit, integrated circuit cores, a pressure sensor, an inertial sensor, a microelectromechanical system (MEMS), passive devices, or a combination thereof.

Unless defined otherwise, all the terms including technical or scientific terms used herein have the same meaning as those understood generally by a person having an ordinary skill in the art. The terms having the same meaning as those defined in generally used dictionaries shall be construed to have the meaning conforming to the contextual meaning of the related technologies, and shall not be construed as ideal or excessively formal meaning unless the terms are apparently defined in this application.

FIG. 1 is a block diagram showing an image compression device 100 according to an embodiment of the inventive concept. Referring to FIG. 1, an image compression device 100 (or an image encoder) may be configured to receive an image IMG from the outside, compress the received image IMG, and output the compressed image IMG_C (or an encoded image). The image compression device 100 may include an object extracting unit 110, a parameter processing unit 120, and an image compression unit 130.

The object extracting unit 110 may perform a convolutional neural network (CNN)-based object extracting operation. In other words, the object extracting unit 100 may be a CNN-based extracting unit.

The object extracting unit 110 may receive the image IMG from an external device. The image IMG may indicate image data such as a photo, an image, a video, or image information. The object extracting unit 110 may perform CNN training to detect objects included in the image IMG.

For example, the object extracting unit 110 may divide an input image IMG into a plurality of modified-regions and classify the divided modified-regions into a plurality of categories on the basis of a pixel change amount. For example, the pixel change amount may indicate a change amount of pixel values between surrounding pixels. Alternatively, the pixel change amount may indicate a pixel value difference (or a change amount) with pixels at an identical position in a previous frame.

As one example, when a pixel change mount of pixels included in a first modified-region is smaller than a specific reference value, the object extracting unit 110 may classify the first modified-region into a category corresponding to the background (namely, a background region). Alternatively, when the pixel change mount of the pixels included in the first modified-region is greater than the specific reference value, the object extracting unit 110 may classify the first modified-region into a category corresponding to an object (namely an object region).

Thereafter, the object extracting unit 110 performs CNN training on the modified-region classified into a category corresponding to the object to identify a type of the object included in the modified-region. In other words, the object extracting unit 110 may separate a background region and an object region, etc, in an image IMG on the basis of a specific condition (e.g. a pixel change amount) and identify an object (e.g. a human, a thing, an animal, a character, or a number, etc.) included in the object region on the basis of the CNN training. For example, in the specification, such an operation of the object extracting unit 110 may be called as modified-region CNN (MR-CNN) training. However, the scope of the present disclosure is not limited thereto.

The parameter processing unit 120 may adjust a quantization parameter (QP) for each modified-region on the basis of a result of the MR-CNN training of the object extracting unit 110. For example, the parameter processing unit 120 may set the quantization parameter for the modified-region classified into the background region as a first quantization parameter. Alternatively, the parameter processing unit 120 may set the quantization parameter for the modified-region in which a text is identified as a second quantization parameter that is smaller than the first quantization parameter. Alternatively, the parameter processing unit 120 may set the quantization parameter for the modified-region in which a thing is identified as a third quantization parameter that is smaller than the first and second quantization parameters.

For example, as the quantization parameter is larger, a data loss for the image increases but a compression rate of the image may be enhanced. On the contrary, as the quantization parameter is smaller, the compression rate of the image decreases but image quality may be enhanced. In other words, the parameter processing unit 120 may improve image quality of a region for which image quality is important (e.g. a modified-region in which a thing is detected) and improve a compression rate of a region for which image quality is not relatively important (e.g. a background region) by differently setting quantization parameters for the respective modified-regions on the basis of a CNN operation result of the object extracting unit 110.

The image compression unit 130 may use a quantization parameter adjusted by the parameter processing unit 120 to compress the image IMG and output the compressed image IMG_C. For example, the image compression unit 130 may use the adjusted quantization parameter to compress the image IMG on the basis of a well-known image compression scheme and may output the compressed image IMG_C.

In example embodiments, the compressed image IMG_C may be provided to an external storage device, a server, or a display device.

As described above, the image compression device 100 (or an image encoder) according to an embodiment of the inventive concept may improve image compression performance and prevent degradation of image quality in comparison to an existing image compression scheme by dividing the image IMG into a plurality of regions and identifying an object in each of plurality of regions the through an MR-CNN training operation and respectively adjusting quantization parameters for the plurality of regions on the basis of the identified object. In addition, since an MR-CNN based training operation according to an embodiment of the inventive concept may rapidly identify an object in comparison to an existing deep neural network-based training operation, a quantization parameter may be rapidly adjusted.

Accordingly, an image compression device is provided which has enhanced performance according to an embodiment of the inventive concept.

Figure 2:
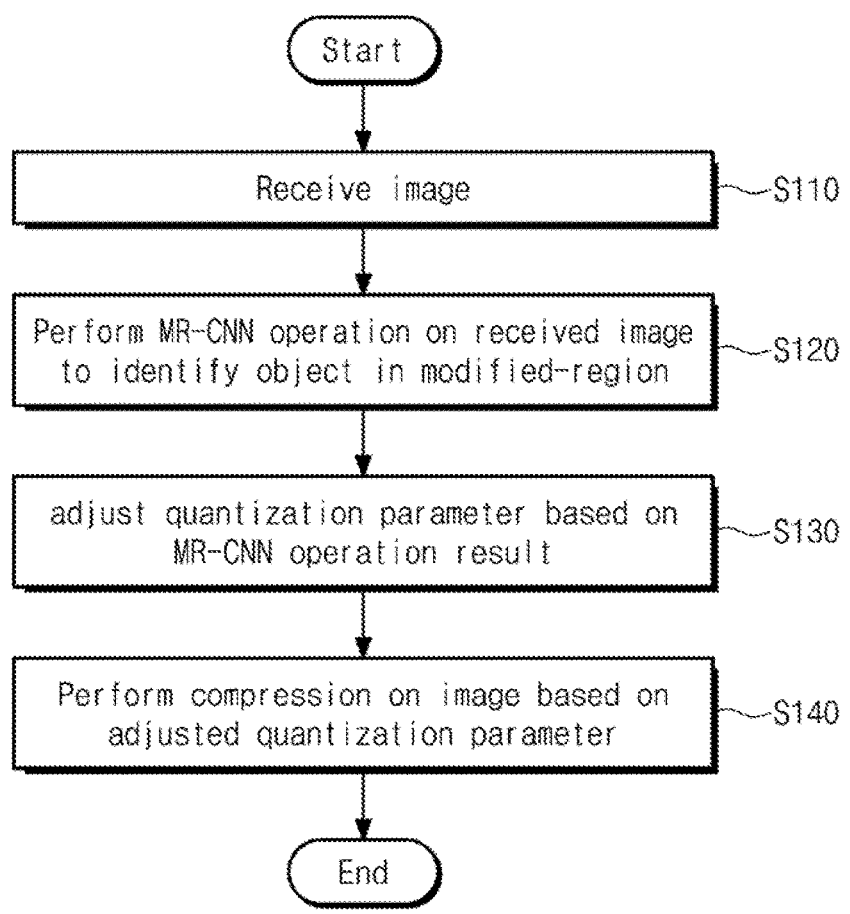
FIG. 2 is a flowchart illustrating an operation of the image compression device of FIG. 1.

FIG. 2 is a flowchart illustrating an operation of the image compression device of FIG. 1. Referring to FIGS. 1 and 2, in operation S110, the image compression device 100 may receive an image IMG from an external device (e.g. a memory, a storage device, a server, a black box, or an image device for surveillance, etc.) The image IMG may be video data including a plurality of frames or photo data showing a still screen.

In operation S120, the image compression device 100 may perform an MR-CNN operation on the received image to identify an object for the modified-region. For example, as described in relation to FIG. 1, the object extracting unit 110 of the image compression device 100 may divide the image IMG into a plurality of modified-regions and classify the modified-regions into a plurality of categories (or a background region and an object region) on the basis of pixel change amounts. Thereafter, the object extracting unit 110 may perform CNN training to identify objects included in the modified-regions classified into the object region. In other words, through the MR-CNN operation, the background region or the object region included in the image IMG may be classified and types of the objects included in the object region may be identified.

In operation S130, the image compression device 100 may adjust a quantization parameter for image compression on the basis of a result of the MR-CNN operation. For example, through the MR-CNN operation as described above, the background region or the object region included in the image IMG may be classified and types of objects included in the object region may be identified. The parameter processing unit 120 of the image compression device 100 may adjust, as a first quantization parameter, a quantization parameter for a region (or a modified-region) classified into the background, and may adjust, as a second quantization parameter that is smaller than the first quantization parameter, a quantization parameter for a region (or a modified-region) classified into an object.

In example embodiments, a magnitude of the second quantization parameter may be adjusted on the basis of the object identified in the object region. For example, when the object identified in the object region is a text, the quantization parameter may be adjusted to the second quantization parameter, and when the object identified in the object region is a thing (or a human or an animal, etc), the quantization parameter may be adjusted to the third quantization parameter (where the third quantization parameter is smaller than the second quantization parameter).

In other words, for an object (e.g. a text, or a thing having a small motion) of which a pixel change amount in the image is relatively small, a quantization parameter may be set relatively large to improve an image compression rate. In addition, for an object (e.g. a moving animal, thing, or human, etc.) of which a pixel change amount in the image is relatively large, a quantization parameter may be set relatively small to improve an image quality.

In operation S140, the image compression device 100 may perform a compression operation on the image on the basis of the adjusted quantization parameter. For example, the compression operation may be performed on the basis of various image compression algorithms such as H.264, JPEG, MPEG, or HEVC, but the inventive concept is not limited thereto.

As described above, the image compression device 100 according to an embodiment of the inventive concept may determine a quantization parameter in a rapid time by rapidly identifying a background or an object, etc. in the image IMG through an MR-CNN based training operation. In addition, the image compression device 100 according to the inventive concept may improve an image compression rate without degradation of image quality by differently adjusting quantization parameters according to objects included in the image IMG. Accordingly, the image compression device is provided which has enhanced performance according to an embodiment of the inventive concept.

Figure 3:
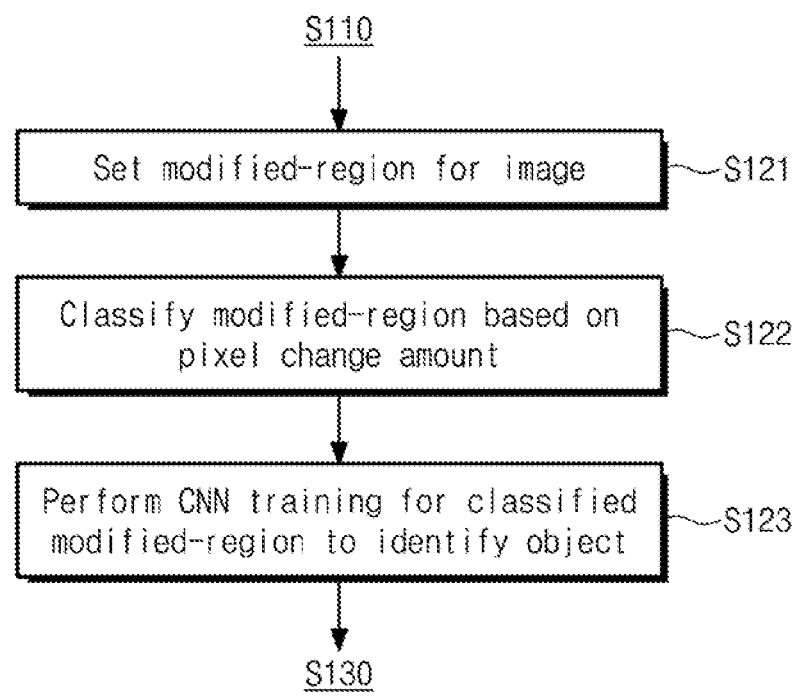
FIG. 3 is a flowchart illustrating in detail operation S120 of FIG. 2.
Figure 4:
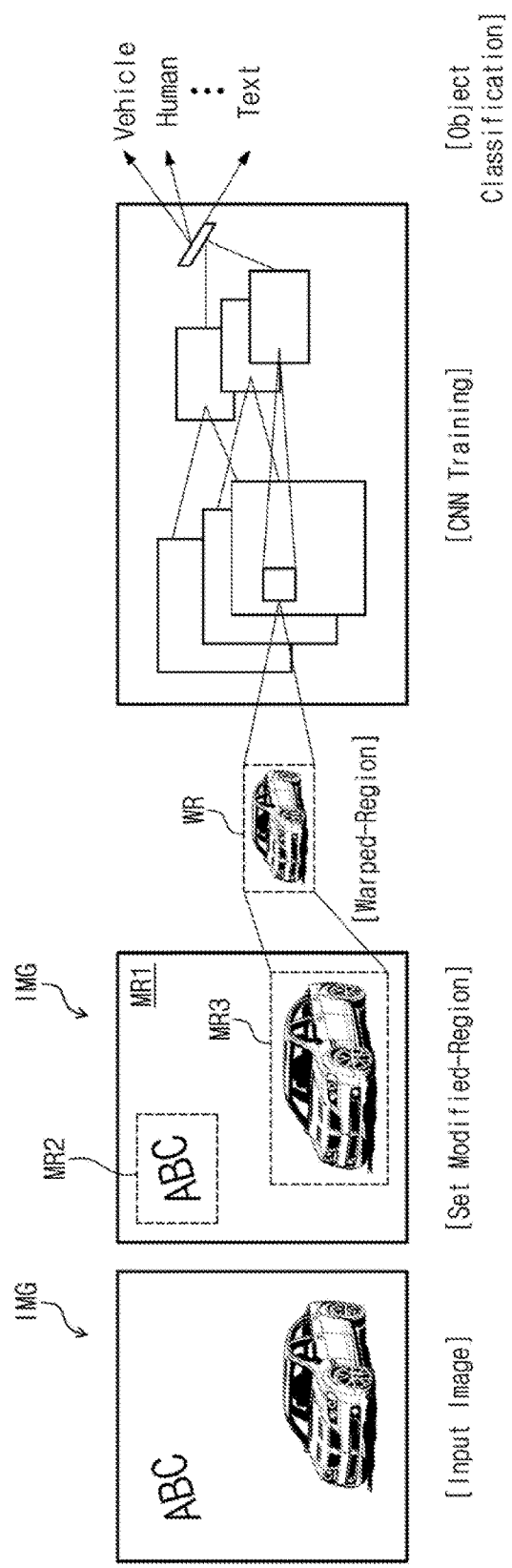
FIG. 4 is a diagram for explaining the operation of FIG. 3.

FIG. 3 is a flowchart illustrating in detail operation S120 of FIG. 2. FIG. 4 is a diagram for explaining the operation of FIG. 3. For example, referring to FIGS. 3 and 4, an operation of the object extracting unit 110 of FIG. 1 will be described in detail. The operation of the object extracting unit 110 to be described in relation to FIGS. 3 and 4 is for explaining an embodiment of the inventive concept in detail and the scope of the inventive concept is not limited thereto.

Referring to FIGS. 1, 3, and 4, in operation S121 after operation S110, the object extracting unit 110 may set modified-regions for the image IMG. For example, it is assumed that the image compression device 100 receives an image IMG illustrated in FIG. 4. At this point, the object extracting unit 110 may set first to third modified-regions MR1 to MR3 in the image IMG. In example embodiments, for conciseness of the drawing, the first to third modified-regions MR1 to MR3 are illustrated as distinguished from each other, but the inventive concept is not limited thereto. A plurality of modified-regions may be set in the image IMG, and some of the plurality of modified-regions or a portion of some of the plurality of modified-regions may overlap each other.

In operation S122, the object extracting unit 110 may classify the set modified-regions on the basis of a pixel change amount. For example, the pixel change amount may indicate a change amount of pixel values between surrounding pixels. Alternatively, the pixel change amount may indicate a pixel value difference (or a change amount) with pixels at an identical position in a previous frame.

For example, the object extracting unit 110 may compare, with a specific reference value, pixel change amounts between pixels included in the first to third modified-regions MR1 to MR3 and classify the first to third modified-regions MR1 to MR3 according to the comparison result. As one embodiment, a change amount of a pixel value may be relatively small in the background included in the image IMG. On the other hand, a change mount of pixel values in various objects (e.g. a moving thing, text, human, or animal, etc.) included in the image IMG may be relatively large.

Accordingly, when a pixel change amount of the first modified-region MR1 is smaller than a reference value, the object extracting unit 110 may classify the first modified-region into a background region. Alternatively, when a pixel change amount of the second modified-region MR2 is larger than the reference value, the object extracting unit 110 may classify the second modified-region into an object region. Alternatively, when a pixel change amount of the third modified-region MR3 is larger than the reference value, the object extracting unit 110 may classify the third modified-region into an object region.

As described above, the object extracting unit 110 may classify each of the plurality of modified-regions into the background region or the object region.

In operation S123, the object extracting unit 110 may perform CNN training on the classified modified-region to identify an object included in the classified modified-region. For example, the object extracting unit 110 may perform the CNN training operation on the modified-region classified as the object region among the plurality of modified-regions. As a more detailed example, the object extracting unit 110 may perform the CNN training operation on the third modified-region MR3. The object extracting unit 110 may convert the third modified-region MR3 into a distortedregion or a converted-region or a warped-region. As an example, the warped-region WR may indicate a region in which the size of the third modified-region MR3 is converted for an input of the CNN training. In other words, the warped-region WR may indicate the input of the CNN training having a fixed size.

The object extracting unit 110 may perform CNN training using the warped-region WR as an input. As a result of the CNN training, an object included in the warped-region WR may be identified. In other words, as a result of the CNN training, an object included in the warped-region WR may be identified as a vehicle, a human, or a text. As illustrated in FIG. 4, as a result of the CNN training, an object included in the third modified-region MR3 is determined to be a vehicle. Although not shown in the drawing, for the second modified-region classified as an object region, an object included therein may be determined to be a text by performing the CNN training.

In other words, the object extracting unit 110 may perform CNN training on the respective modified-regions classified into the object regions to identify types of the objects included in the modified regions.

In example embodiments, after operation S123, the image compression device 100 may perform operation S130.

Figure 5:
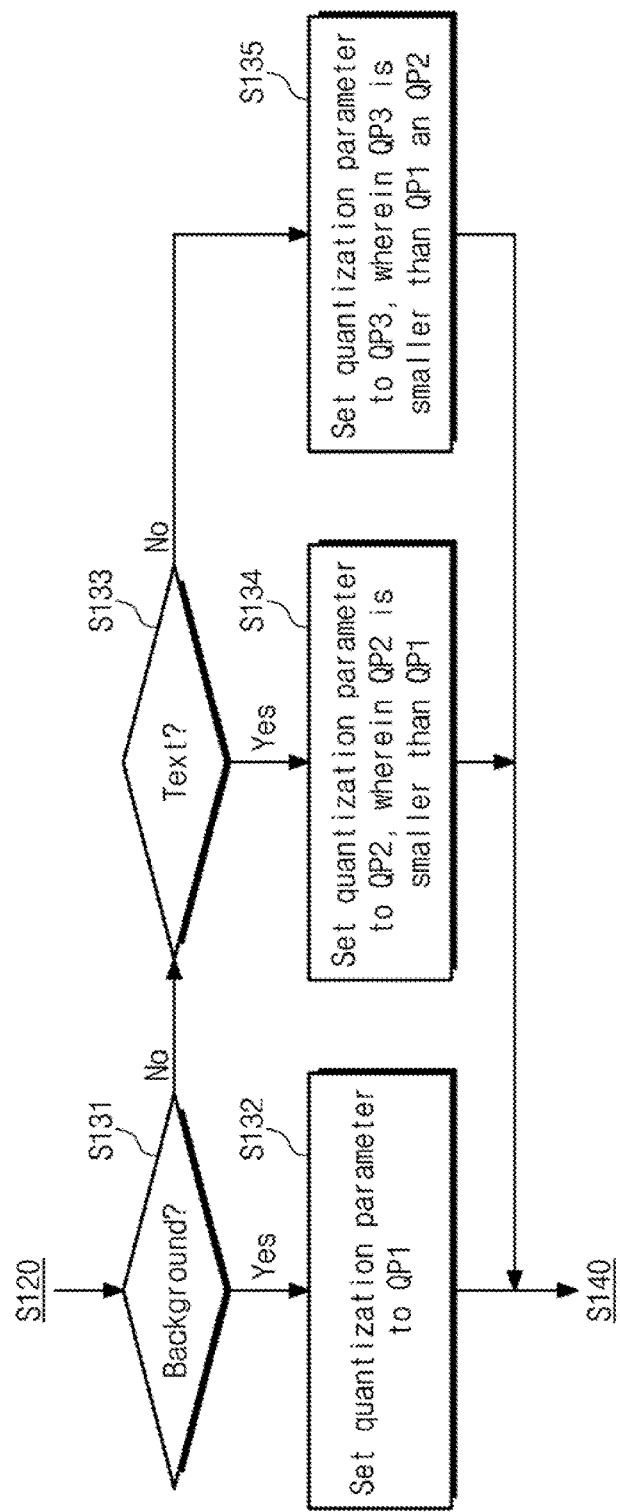
FIG. 5 is a flowchart illustrating in detail operation S130 of FIG. 3.
Figure 6:
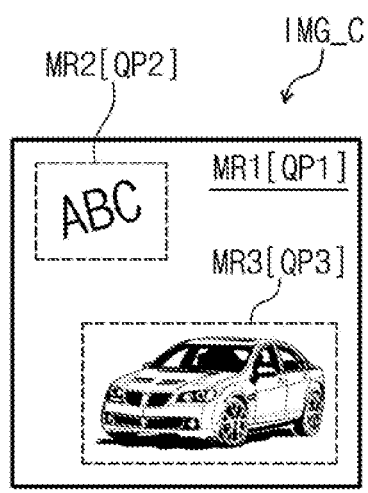
FIG. 6 is a diagram for explaining the operation of FIG. 5.

FIG. 5 is a flowchart illustrating in detail operation S130 of FIG. 3. FIG. 6 is a diagram for explaining the operation of FIG. 5. In example embodiments, an operation of the parameter processing unit 120 will be described in relation to FIGS. 5 and 6. The operation of the parameter processing unit 120 to be described in relation to FIGS. 5 and 6 is for simply explaining an embodiment of the inventive concept in detail, and the scope of the inventive concept is not limited thereto. In addition, although FIG. 5 illustrates an embodiment in which a quantization parameter is set to a first, a second, or a third parameter, the scope of the inventive concept is not limited thereto, and the quantization parameter may be set in various ways according to types of objects identified by the object extracting unit 110.

Referring to FIGS. 1, 5, and 6, after operation S120 (i.e. the object identifying operation of the object extracting unit 110), in operation S131, the parameter processing unit 120 may determine whether a modified-region is a background region. For example, as described in relation to operation S122 of FIG. 3, the first modified-region MR1 may be classified into a background region by the object extracting unit 110.

When a modified-region is a background region, in operation S132, the parameter processing unit 120 may set a quantization parameter for the modified-region to a first quantization parameter QP1. For example, as illustrated in FIG. 6, the parameter processing unit 120 may set, to a first quantization parameter QP1, the quantization parameter for the first modified-region MR1 classified into a background region. For example, the first quantization parameter QP1 may be a relatively large value. For example, that a quantization parameter is relatively large means that an image compression rate is relatively high.

When the modified-region is not the background region, in operation S133, the parameter processing unit 120 determines whether an object included in the modified-region is a text. For example, as described in relation to operation S122 and S123 of FIG. 3, the second and third modified-regions MR2 and MR3 may be classified into an object region by the object extracting unit 110, the object included in the second modified-region MR2 may be identified as a text, and the object included in the third modified-region MR3 may be determined as a vehicle. The parameter processing unit 120 may determine types of the objects classified or identified by the object extracting unit 110 on the basis of the result of the CNN training.

When an object included in a modified-region is a text, in operation S134, the parameter processing unit 120 may set a quantization parameter for the modified-region to a second quantization parameter QP2. At this point, the second quantization parameter QP2 may be smaller than the above described first quantization parameter QP1. For example, as described above, the object included in the second modified-region MR2 may be identified as a text, and accordingly, the parameter processing unit 120 may set the quantization parameter for the second modified-region MR2 to the second quantization parameter QP2.

When the object included in the modified-region is not the text, in operation S135, the parameter processing unit 120 may set a quantization parameter for the modified-region to a third quantization parameter QP3. At this point, the third quantization parameter QP3 may be smaller than the first and second quantization parameter QP1 and QP2. For example, the third modified-region MR3 is classified into an object region by the object extracting unit 110 and the object included in the third modified-region MR3 may be identified as a vehicle. Accordingly, the parameter processing unit 120 may set a quantization parameter for the third modified-region MR3 to the third quantization parameter QP3.

In example embodiments, after operations S131 to S135 are performed, operation S140 may be performed. For example, the image compression device 100 may be configured to respectively apply the first to third quantization parameters QP1 to QP3 to the first to third modified-regions MR1 to MR3 to output a compressed image IMG_C.

For example, as the quantization parameter is larger, the image compression rate increases, but image distortion or quality degradation may also increase. On the other hand, as the quantization parameter is smaller, the image compression rate decreases but image distortion or quality degradation may also decrease. In other words, the image compression device 100 according to the inventive concept may improve an image compression rate and minimize degradation of image quality by differently setting quantization parameters from each other according to characteristics of objects included in the image IMG.

For example, since a change amount of pixel values is typically relatively small in a background region included in the image IMG, even if a high compression rate is applied, degradation of image quality may be small. On the other hand, since a change mount of pixel values is typically relatively large in an object such as a thing, a human, an animal, or a text, when a high compression rate is applied, degradation of image quality may increase. Accordingly, the image compression device 100 according to the inventive concept may maximize the image compression rate and reduce degradation of the image quality by applying the first quantization parameter QP1 to the first modified-region MR1 classified into the background region and applying the second and third quantization parameters QP2 and QP3, which are smaller than QP1, to the second and third modified regions MR2 and MR3, which are classified into the object region.

In addition, the image compression device 100 according to the inventive concept may differently set quantization parameters according to types of objects included in the image IMG. For example, like the second modified-region MR2, when the included object is identified as a text, since a pixel change amount for the text is relatively small, even if a relatively high compression rate (which is smaller than that of the background region) is applied, the image degradation may not be large. On the contrary, like the third modified-region MR3, when the included object is identified as a vehicle (or another thing, a human, or an animal, etc.), since a pixel change amount for the vehicle is relatively large, degradation of the image quality may occur when a relatively high compression rate is applied. Accordingly, the image compression device 100 according to the inventive concept may maximize an image compression rate and reduce degradation of image quality by differently setting quantization parameters according to types of objects included in the image IMG.

For example, although operations of region classification for some modified-regions, object identification, and quantization parameter setting are sequentially illustrated in the flowchart for implementing the above-described embodiments of the inventive concept, the scope of the inventive concept is not limited thereto. The image device 100 according to an embodiment of the inventive concept may sequentially, in parallel, or simultaneously perform the above-described operations with respect to a plurality of modified-regions or divided regions. Alternatively, the image compression device 100 according to an embodiment of the inventive concept may iteratively perform the above-described operations until the quantization parameters for respective regions in the image IMG are all set.

In addition, the image compression device 100 according to an embodiment of the inventive concept may be configured to perform region classification, object identification, quantization parameter adjustment and image compression in a unit of the above-described modified-region. Alternatively, the image compression device 100 according to an embodiment of the inventive concept may be configured to perform a compression operation on one image, after the quantization parameters for the modified-regions in one image are all set.

In addition, in the above-described embodiments, the embodiments of the inventive concept have been described based on a type (i.e. a text and vehicle) of a portion of objects, but the scope of the present disclosure is not limited thereto. In addition, types of various objects (i.e. various still things, various moving things, a human, or an animal, etc.) may be identified and quantization parameters may be set differently according to types of respective objects. As an example, even if identified objects are the same vehicle, quantization parameters for a region including a moving vehicle and a region including a still vehicle may be set differently.

As described above, the image compression device according to an embodiment of the inventive concept may classify regions in the image IMG through the CNN training and rapidly identify objects included in the regions. The image compression device may prevent degradation of image quality and improve the compression rate for the image IMG by differently setting quantization parameters on the basis of the classified regions and identified objects.

For example, in the embodiments of the present disclosure, the quantization parameter has been described as an element for adjusting a compression rate and quality of the image, but the scope of the present disclosure is not limited thereto. For example, the image compression device according to the present disclosure may be configured to adjust at least one of various parameters used in a compression operation on the basis of the identified objects or to adjust a compression scheme according to each region such that the compression rate becomes maximized without degradation of image quality.

In HEVC that is one of typical image compression techniques, a method for determining a skip mode on the basis of a quantization parameter for inter-prediction provides an improved speed in an inter-mode. However, due to complexity of equations for the determination method, there are limitations that hardware complexity for implementing this increases and a speed is lowered due to serial processing according to depth information. However, since the image compression device 100 according to an embodiment of the inventive concept may rapidly set the quantization parameters for respective regions on the basis of the CNN training, complexity of the hardware configuration, which is a limitation of the existing technology, may be reduced. In addition, since parallel processing is easy to be realized at the time of implementation in system-on-chip (SoC), a speed of an image compression operation is enhanced.

Figure 7:
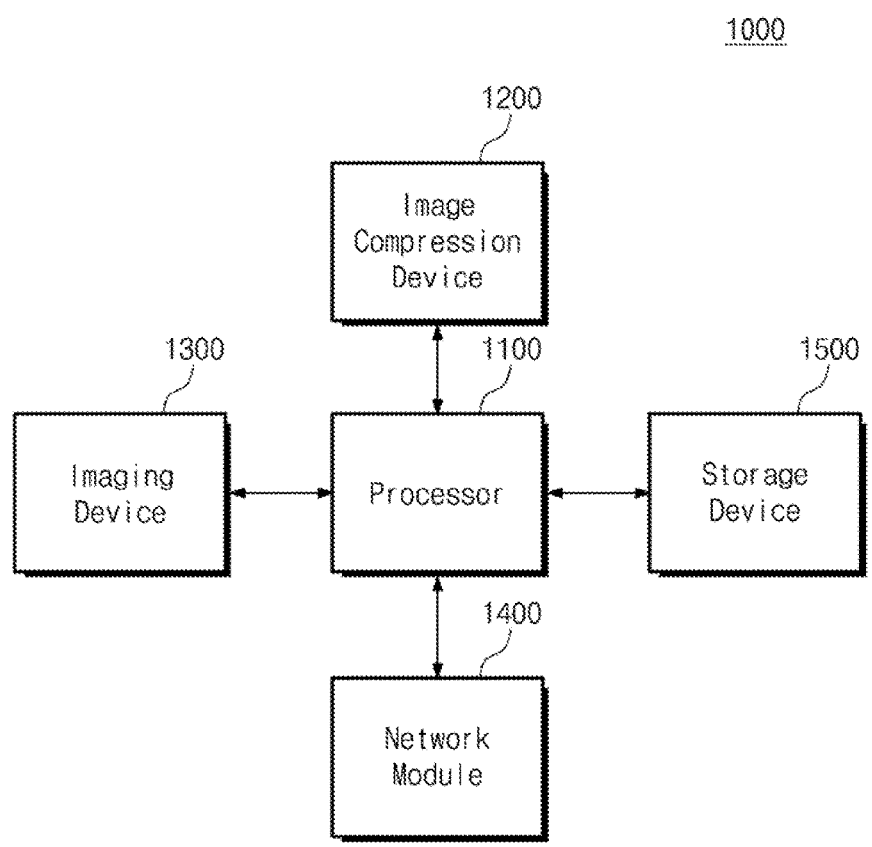
FIG. 7 is a block diagram exemplarily showing a user device to which an image compression device according to an embodiment of the inventive concept is applied.

FIG. 7 is a block diagram exemplarily showing a user device to which an image compression device according to an embodiment of the inventive concept is applied. Referring to FIG. 7, a user device 1000 may include a processor 1100, an image compression device 1200, an imaging device 1300, a network module 1400, and a storage device 1500. For example, the user device 1000 may be any one of computing systems such as an Ultra Mobile PC (UMPC), workstation, net-book, Personal Digital Assistants (PDA), portable computer, web tablet, wireless phone, mobile phone, smart phone, e-book, portable multimedia player (PMP), game console, navigation device, black box, digital camera, Digital Multimedia Broadcasting (DMB) player, digital audio recorder, digital audio player, digital picture recorder, digital picture player, digital video recorder, or digital video player.

The processor 1100 may control the overall operation of the user device 1000. The processor 1100 may drive elements included in the user device 1000, or an operation system (OS), etc. The application processor 1100 may include a graphic engine, controller for controlling the elements included in the user device 1000, or interfaces.

The image compression device 1200 may be configured to compress (i.e. encode) or uncompress (i.e. decode) an image generated by the user device 1000, received externally or output externally. For example, although not shown in the drawing, the image compression device 1200 may be embedded in the processor 1100 in a form of an intellectual property (IP) block. For example, the image compression device 1200 may compress an image by including the structure of the image compression device 100 having been described with reference to FIGS. 1 to 6 or according to the operation methods having been described with reference to FIGS. 1 to 6.

The imaging device 1300 may be an image acquiring device configured to capture the front view and acquire image data, such as an image sensor, an image sensor module, a video camera, a surveillance camera, or a digital camera. For example, the image data acquired from the imaging device 1300 may be compressed by the image compression device 1200.

The network module 1400 may be configured to communicate with external devices. For example, the network module 1400 may be configured to support wired communication or wireless communication such as Code Division Multiple Access (CDMA), Global System for Mobile communication (GSM), wideband CDMA (WCDMA), CDMA-2000, Time Division Multiple Access (TDMA), Long Term Evolution (LTE), Wimax, WLAN, UWB, Bluetooth, or WI_DI. For example, the image data received through the network module 1400 may be compressed or uncompressed by the image compression device 1200. Alternatively, the image compressed or uncompressed by the image compression device 1200 may be provided to an external device (e.g. another user device, a data server, or a display device, etc.) through a network module.

The storage device 1500 may be configured to store data required to operate the user device 1000 or data generated in operation. The storage device 1500 may be provided with a large-capacity semiconductor memory device such as Dynamic Random Access Memory (DRAM), Synchronous DRAM (SDRAM), Static RAM (SRAM), Double Date Rate SDRAM (DDR SDRAM), DDR2, SDRAM, DDR3 SDRAM, Phase-change RAM (PRAM), Magnetic RAM (MRAM), Resistive RAM (RRAM), NAND flash, or NOR flash, or a large-capacity magnetic disk device such as Hard Disk Drive (HDD). For example, the image data stored in the storage device 1500 may be compressed or uncompressed by the image compression device 1200. Alternatively, the image compressed or uncompressed by the image compression device 1200 may be stored in the storage device 1500.

As described above, the image compression device according to an embodiment of the inventive concept performs MR-CNN training to classify image regions, identify an object in the classified region, and adjust a quantization parameter of each region on the basis of the identified object. Accordingly, an image compression rate may increase without degradation of image quality. Therefore, an image compression device having improved performance and an operation method thereof are provided.

According to an embodiment of the inventive concept, an image compression device is provided which has an enhanced image compression rate without deterioration of image quality by separating an object, a character, and a background from each other in an image using a convolutional neural network (CNN) and on the basis of this, by adjusting a quantization parameter.

In addition, according to an embodiment of the inventive concept, an image compression device is provided which has an enhanced image compression rate, since a quantization parameter may be quickly set by separating an object, a character, and a background from each other in an image using a convolutional neural network (CNN) and on the basis of this, by adjusting a quantization parameter.

The above-described is detailed embodiments for practicing the present disclosure. The present disclosure includes not only the above-described embodiments but also simply changed or easily modified embodiments. In addition, an embodiment of the inventive concept also include techniques easily modified and practiced using the embodiments of the present disclosure. Therefore, the scope of the present disclosure is not limited to the described embodiments but is defined by the claims and their equivalents.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An image compression device comprising:
    an object extracting circuit configured to perform convolution neural network (CNN) training to identify an object from an image received externally;
    a parameter adjusting circuit configured to adjust a quantization parameter of a region in which the identified object is included in the image on the basis of the identified object; and
    an image compression circuit configured to compress the image on the basis of the adjusted quantization parameter,
    wherein the object extracting circuit sets modified-regions in the received image and performs the CNN training on a portion of the set modified-regions to identify a type of an object included in the portion of the set modified-regions,
    the object extracting circuit classifies each of the modified-regions into one of a background region and an object region on a basis of pixel change amounts of the respective set modified-regions, and
    wherein the object extracting circuit classifies the modified-region into the background region, when the pixel change amount is smaller than a reference value in each of the set modified-regions and classifies the modified-region into the object region when the pixel change amount is equal to or greater than the reference value.

2. The image compression device of claim 1, wherein the object extracting circuit converts the modified-region that is classified into the object region into a warped-region and performs the CNN training using the warped-region as an input to identify a type of the object included in the object region.

3. The image compression device of claim 1, wherein the parameter adjusting circuit sets a quantization parameter for the background region to a first value and sets a quantization parameter for the object region to a second value smaller than the first value.

4. The image compression device of claim 1, wherein the parameter adjusting circuit sets a quantization parameter for the background area to a first value, sets a quantization parameter for the object region to a second value smaller than the first value when the type of the object included in the object region is a text, and sets the quantization parameter for the object region to a third value smaller than the second value when the type of the object included in the object region is not the text.

5. An image compression device comprising:
    an object extracting circuit configured to perform convolution neural network (CNN) training to identify an object from an image received externally;
    a parameter adjusting circuit configured to adjust a quantization parameter of a region in which the identified object is included in the image on the basis of the identified object; and
    an image compression circuit configured to compress the image on the basis of the adjusted quantization parameter,
    wherein the object extracting circuit sets modified-regions in the received image and performs the CNN training on a portion of the set modified-regions to identify a type of an object included in the portion of the set modified-regions,
    wherein the object extracting circuit classifies each of the modified-regions into one of a background region and an object region on a basis of pixel change amounts of the respective set modified-regions, and
    wherein the parameter adjusting circuit sets a quantization parameter for the background area to a first value, sets a quantization parameter for the object region to a second value smaller than the first value when the type of the object included in the object region is a text, and sets the quantization parameter for the object region to a third value smaller than the second value when the type of the object included in the object region is not the text.

6. An image compression device comprising:

an object extracting circuit configured to set modified-regions in an image received externally, classify each of the set modified-regions into a background region or an object region based on pixel change amount of the each of the set modified-regions, and perform convolution neural network (CNN) training on the object region among of the set modified-regions to identify a type of an object included in the object region;

a parameter adjusting circuit configured to adjust a quantization parameter of each of the set modified regions based on whether each of the set modified regions is classified into the background region or the object region, and the type of the object identified by the CNN training; and an image compression circuit configured to compress the received image on the basis of the adjusted quantization parameter, wherein pixel change amount of the object region is equal to or greater than a reference value, pixel change amount of the background region is smaller than the reference value.

7. The image compression device of claim 6, wherein the object extracting circuit converts the object region into a warped-region and performs the CNN training using the warped-region as an input to identify a type of the object included in the object region.

8. The image compression device of claim 6, wherein the parameter adjusting circuit adjusts a quantization parameter for the background region to a first value and adjusts a quantization parameter for the object region to a second value smaller than the first value.

9. The image compression device of claim 6, wherein the parameter adjusting circuit adjusts a quantization parameter for the background area to a first value, adjusts a quantization parameter for the object region to a second value smaller than the first value when the type of the object included in the object region is a text, and adjusts the quantization parameter for the object region to a third value smaller than the second value when the type of the object included in the object region is not the text.

* * * * *